Figure 1:
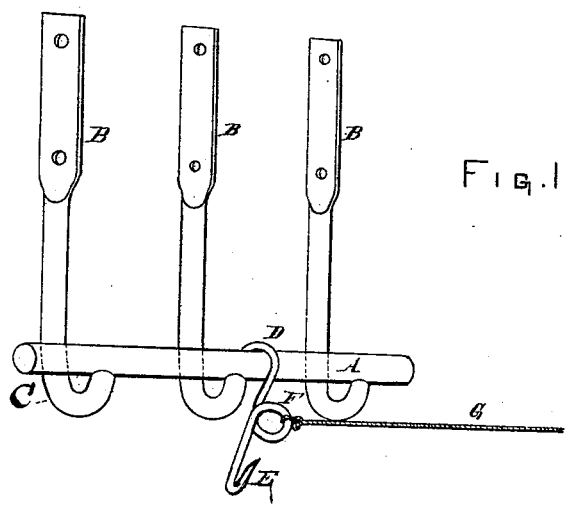

P. L. GROOT.
APPARATUS FOR MOVING AND COOLING HOGS.

No. 180,712.        Patented Aug. 8, 1876.

UNITED STATES PATENT OFFICE.

PETER L. GROOT, OF CHICAGO, ILLINOIS.

IMPROVEMENT IN APPARATUS FOR MOVING AND COOLING HOGS.

Specification forming part of Letters Patent No. 180,712, dated August 8, 1876; application filed July 3, 1876.

*To all whom it may concern:*

Be it known that I, PETER L. GROOT, of Chicago, county of Cook and State of Illinois, have invented a new and useful Improvement in Apparatus for Moving and Cooling Hogs, of which the following is a specification:

The nature of the present invention consists in a round bar of suitable strength, and arranged inside of a cooling-house, and supported by curved pendants in such a manner that the hooks supporting the hogs may slide uninterrupted by the hooks from end to end on the bar. The hooks for moving the hogs have central eyes for attaching a lowering and drawing rope, as the whole is to be hereinafter fully described and shown.

A is a bar extending into a cooling-room any desired distance, to support and cool hogs. The ends B B of the curved pendants are provided with holes to receive screws for fastening them to hanger-beams overhead in the cooling-house. The lower ends C are brought down such a distance below the bar A as will permit a hook, E F, to slide on the bar freely, and they are fastened to the bar by extending into holes drilled for that purpose. That part of the hook shown at D slides on the bar A. The hook F supports a rope, G, for letting hogs down from above and sliding them on the bar, and hook E fastens to the hog. When the latter are moved to the position required, ordinary double-ended hooks may be substituted for the line-hook.

I have described the hooks to be used on the rod to show the utility of the latter attached as described to the curved pendants.

I claim and desire to secure by Letters Patent—

The rod A, supported by the curved pendants B C, as and for the purpose set forth.

PETER L. GROOT.

Witnesses:
  O. H. ADIX,
  G. L. CHAPIN.